Aug. 18, 1925.

P. VELASCO 1,550,596

PNEUMATIC WHEEL

Filed Aug. 21, 1923     2 Sheets-Sheet 1

Inventor
P. Velasco,

By

Attorney

Patented Aug. 18, 1925.

1,550,596

UNITED STATES PATENT OFFICE.

PEDRO VELASCO, OF DETROIT, MICHIGAN.

PNEUMATIC WHEEL.

Application filed August 21, 1923. Serial No. 658,603.

*To all whom it may concern:*

Be it known that PEDRO VELASCO, a subject of Mexico, residing at Detroit, in the county of Wayne and State of Michigan, has invented new and useful Improvements in Pneumatic Wheels, of which the following is a specification.

The object of the invention is to provide a wheel construction of the cushioned type whereby the necessity of employing pneumatic or similar tires may be avoided without detracting from the required resilience of the vehicle truck or running gear, and more particularly to provide a cushioned wheel which without being of objectionable weight is adapted to absorb shocks of practically unlimited force with the minimum tendency to distort and disarrange the elements; and with this object in view the invention consists in a construction and combination of parts of which a preferred embodiment is shown in the accompanying drawings, wherein:—

Figure 1:
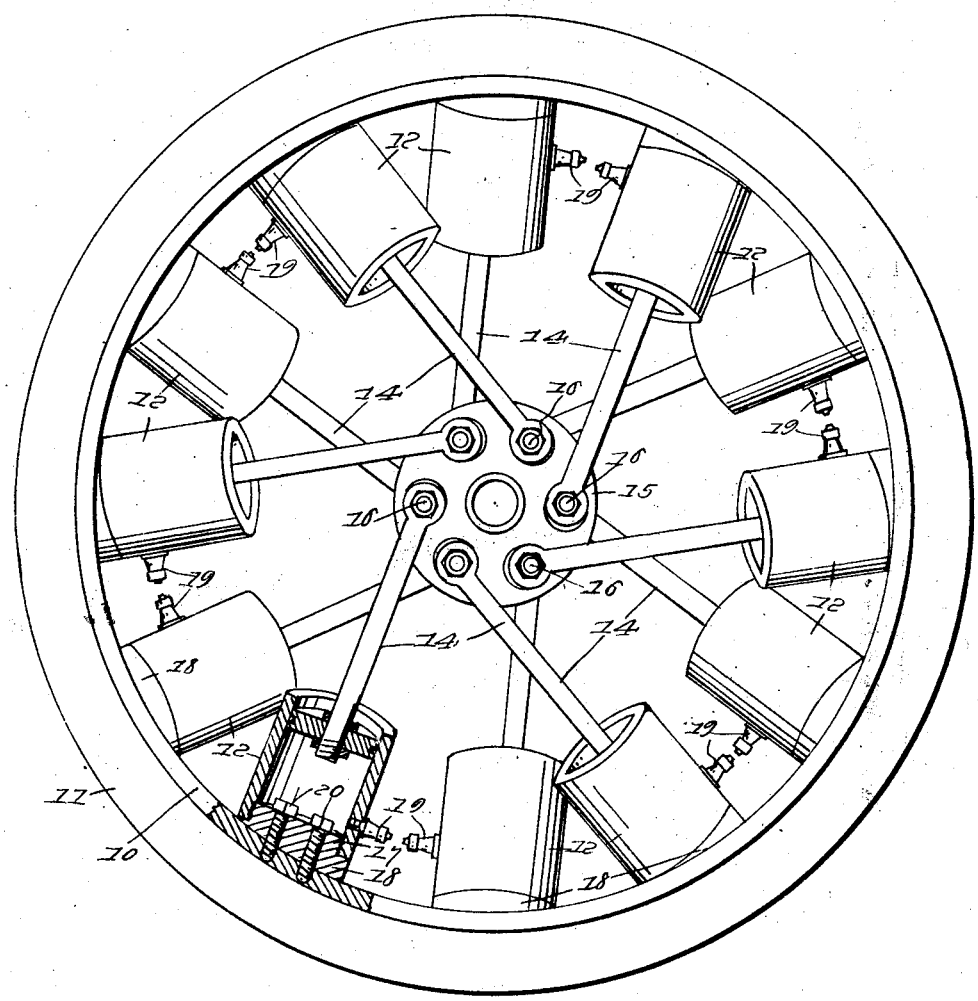
Figure 1 is a side view partly in section.

Within a suitable rim 10 adapted to carry a tire 11 of any preferred variety is arranged a group of cylinders 12 arranged in parallel series with the elements of each series disposed in a common relation with the rim and with the elements of the two series arranged in angularly opposed relation. The pistons 13 in said cylinders of each series are connected by rods 14 with one of the hub disks 15, a pivotal mounting being afforded by means of a bolt 16 at the inner end of each piston rod.

In the construction illustrated, the wall of each cylinder which is open at its inner end is interiorly threaded at its outer end to receive a threaded plug 17 forming part of a block 18 secured by screws 20 to the rim, so that to dismember the wheel it is only necessary to unscrew the cylinders from the blocks. The cylinders are preferably charged with air under pressure through air valves 19, and the degree of compression is dependent upon the load for which the particular wheel is designed. It is obvious that the contents of the cylinder being a compressive fluid will yield to movement of the pistons due to shocks and jars imposed upon the wheel through the tire or through the hub and that a substantially balanced relation of the wheel will be maintained normally when the cylinders are charged at a substantially uniform pressure.

Figure 2:
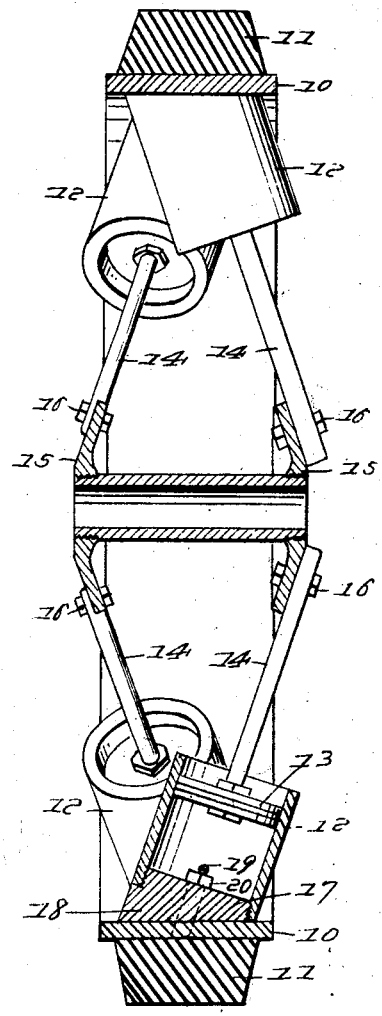
Figure 2 is a cross sectional view of a wheel constructed in accordance with the invention.

The cylinders are pitched transversely as shown in Figure 2 to give the effect of a centrally bowed wheel with the inner ends of the piston rods of the two series spaced apart a distance sufficient to afford the required transverse stiffness while the outer ends or bases of the cylinders are arranged substantially in a common plane. The axes of the cylinders and the piston rods extending therefrom and disposed in tangential relation with the hub, all of the cylinders of each series having the same tangential relation with the hub and with the cylinders of the two series arranged in angularly opposed tangential relation therewith so that the cushioning elements of the two series act in a compensatory relation.

Having described the invention, what is claimed as new and useful is:—

1. A pneumatic wheel having a rim and hub of which the former carries cylinders provided with pistons of which the rods are pivotally connected at their inner ends with the hub, the cylinders being arranged in series of which the elements are disposed in angularly opposed tangential positions.

2. A pneumatic wheel having a rim and hub of which the former carries cylinders provided with pistons of which the rods are pivotally connected at their inner ends with the hub, the cylinders being arranged with their outer ends substantially in a common plane and being disposed in complemental series with the inner ends of the piston rods of the two series arranged in transversely spaced relation.

In testimony whereof he affixes his signature.

PEDRO VELASCO.